United States Patent
Kozuka

(10) Patent No.: US 7,971,895 B2
(45) Date of Patent: Jul. 5, 2011

(54) TRAILER HITCH AND REAR STRUCTURE HAVING TRAILER HITCH FOR VEHICLE

(75) Inventor: Kenichi Kozuka, Tokyo (JP)

(73) Assignee: Fuji Jukogyo Kabushiki Kaisha, Shinjuku-ku, Tokyo (JP)

( * ) Notice: Subject to any disclaimer, the term of this patent is extended or adjusted under 35 U.S.C. 154(b) by 204 days.

(21) Appl. No.: 12/320,880

(22) Filed: Feb. 6, 2009

(65) Prior Publication Data

US 2009/0206577 A1 Aug. 20, 2009

(30) Foreign Application Priority Data

Feb. 14, 2008 (JP) ................................. 2008-033321

(51) Int. Cl.
*B60D 1/14* (2006.01)
(52) U.S. Cl. ...................... 280/495; 280/491.5; 280/502
(58) Field of Classification Search ............... 280/291.5, 280/495, 502
See application file for complete search history.

(56) References Cited

U.S. PATENT DOCUMENTS

| | | | | | |
|---|---|---|---|---|---|
| 3,768,837 | A | * | 10/1973 | Reese | 280/495 |
| 5,102,156 | A | * | 4/1992 | Fink et al. | 280/495 |
| 5,193,837 | A | * | 3/1993 | Fink et al. | 280/495 |
| 5,511,813 | A | * | 4/1996 | Kravitz | 280/495 |
| 5,620,198 | A | * | 4/1997 | Borchers | 280/507 |
| 5,873,594 | A | * | 2/1999 | McCoy et al. | 280/491.5 |
| 6,409,202 | B1 | * | 6/2002 | Putnam | 280/495 |
| 6,601,868 | B1 | * | 8/2003 | McCoy et al. | 280/495 |
| 6,783,266 | B2 | * | 8/2004 | McCoy et al. | 362/485 |
| 7,114,741 | B2 | * | 10/2006 | Marvin et al. | 280/495 |
| 2001/0035628 | A1 | * | 11/2001 | McCoy et al. | 280/495 |
| 2006/0006626 | A1 | * | 1/2006 | Scruggs | 280/495 |
| 2006/0049613 | A1 | * | 3/2006 | Marvin et al. | 280/495 |
| 2006/0186637 | A1 | * | 8/2006 | Scruggs | 280/495 |
| 2008/0129012 | A1 | * | 6/2008 | Scruggs | 280/495 |

FOREIGN PATENT DOCUMENTS

JP 2006-44352 2/2006

* cited by examiner

*Primary Examiner* — Joanne Silbermann
*Assistant Examiner* — Tashiana Adams
(74) *Attorney, Agent, or Firm* — McGinn IP Law Group, PLLC

(57) ABSTRACT

A trailer hitch is disclosed, which is configured to be provided at a rear part of a vehicle. The trailer hitch of the invention includes a pair of hitch side members. Each of the hitch side members including a mounting part and a cross member installation part. The mounting part is configured to be connected to a support portion of a rear side member of the vehicle, and the cross member installation part is configured to protrude from a rear end of the rear side member. The trailer hitch further includes a cross member and a hitch ball support member. The cross member extends in a widthwise direction of the vehicle, and having ends connected to the cross member installation part, and the hitch ball support member has a hitch ball. The upper end of the hitch ball support member is provided on the cross member so as to suspend therefrom.

7 Claims, 14 Drawing Sheets

Prior Art

TRAILER HITCH AND REAR STRUCTURE HAVING TRAILER HITCH FOR VEHICLE

CROSS REFERENCE TO RELATED APPLICATIONS AND INCORPORATION BY REFERENCE

This application is based upon and claims the benefit of priority from the prior Japanese Patent Application No. 2008-033321, filed on Feb. 14, 2008; the entire content of which is incorporated herein by reference.

BACKGROUND OF THE INVENTION

1. Field of the Invention

The present invention relates to a trailer hitch configured to be provided on a rear part of a vehicle, and to a rear structure of a vehicle having the trailer hitch.

2. Discussion of the Related Art

Various structures for mounting a trailer hitch on a rear part of a vehicle have been proposed. The trailer hitch is a member for detachably linking a trailer to a vehicle by way of a joint provided at a front part of a trailer.

Japanese Kokai Publication 2006-44352, for example, discloses an embodiment for a rear structure of a vehicle having a trailer hitch. The rear structure will be explained by referring to FIGS. 15 and 16.

FIG. 15 is a schematic cross-section of a rear structure of a vehicle having a trailer hitch. Further, FIG. 16 is a cross section of FIG. 15 obtained by cutting the rear structure thereof at a line with arrows XVI.

In a rear structure of a vehicle, a pair of rear side members extends in a lengthwise direction of a vehicle. FIG. 15 shows that a rear side member 102 extends in a lengthwise direction of the vehicle and is provided on a bottom surface of a floor section of the vehicle. On the other hand, a cross member 110 extends in a widthwise direction of the vehicle. For the connection, a rear end of the rear side member 102 abuts against a front surface of the cross member 110.

As shown in FIG. 16, a reinforcement member 112 is provided between the rear side member 102 and the cross member 110. The reinforcement member 112 includes an overhang part 113 having an outer periphery 113a so that the reinforcement member 112 has a cross section in the form of a hat having inclined side wall extending approximately in a lengthwise direction of the vehicle. Thus, the cross member 110 and the reinforcement member 112 form a structure with a closed cross section.

The rear side member 102 has an inclined weld flange 103 extending in a lengthwise direction of the vehicle at the rear end of the rear side member 102.

The overhang part 113 of the reinforcement member 112 protrudes in a frontward direction of the vehicle, and fits into the weld flange 103. In this structural configuration, the weld flange 103 of the rear side member 102 is welded to the outer periphery 113a of the overhand part 113.

On the other hand, a trailer hitch 120 includes a hitch ball 121 and arms 123 provided at both the ends of a frame 122, as described in FIG. 15 by an imaginary line. Therein, the frame 122 extends in a widthwise direction of the vehicle and supports the hitch ball 121 thereon. Moreover, the arms 123 extend from the frame 122 in a frontward direction of the vehicle, and frontal upper parts 123a of the arms 123 are fastened (bolted) to a rear lateral part 102a of the rear side members 102 with bolts.

In the above described structure, it is possible to prevent the welded parts from being separated from each other when a lengthwise force of the vehicle is repeatedly applied to the rear side member 102 via the trailer hitch for attracting a trailer (not shown). This is because the extending direction in a connection surface (defined by welding the outer periphery 113a of the overhang part 113 to the weld flanges 103) extends approximately in parallel with the direction of shearing force applied to this section.

Accordingly, the strength of the connection between the rear side members 102 and the cross member 110 is improved, so as to resist the load applied from the trailer to the rear side member 102.

In addition to the structure of the trailer hitch 120 itself, the fastening of the front upper ends of the arms 123 to the rear lateral parts 102a of the rear side members 102 reinforces the rigidity of the rear parts of the rear side members 102 for a broad range.

However, in the above trailer hitch 120, the rigidity of the rear side member 102 is excessively improved. In other words, the excessive reinforcement restricts the rear side member 102 from compression deformation in an axial direction of the rear side member 102. Therefore, the rear side member 102, especially at the rear part thereof, would fail to efficiently absorb a load which could be applied to the trailer hitch 120 by a rear-end collision or the like. In particular, if the above structure is attached to a vehicle that has a short rear overhang, the rear side members have limited compression deformation. This makes it difficult for the reinforced rear side member to effectively absorb the load applied by a collision.

SUMMARY OF THE INVENTION

It is therefore an object of the present invention to provide a trailer hitch to be provided at a rear part of a vehicle which can efficiently absorb a load applied to a rear part of the vehicle in case of a rear-end collision, comprising pair of hitch side members, each of the hitch side members comprising a mounting part and a cross member installation part, the mounting part being configured to be connected to a portion of a rear side member of the vehicle, and the cross member installation part being configured to protrude from a rear end of the rear side member; a cross member extending in a widthwise direction of the vehicle, having ends connected to the cross member installation part; and a hitch ball member having a hitch ball supported thereon, an upper end of the hitch ball member being connected to the cross member at the center thereof with respect to a widthwise direction of the vehicle, and the hitch ball support member downwardly extending from the cross member.

With the above structure of the trailer hitch, the impact load is absorbed mainly by the torsion and buckling deformation of a cross member of the vehicle.

It is another object of the present invention to provide a trailer hitch which can absorb a large quantity of impact load or an impact load applied to a rear part of the vehicle by off-set rear-end collision, wherein each of the hitch side members further comprises a rear contact face configured to be provided at a rear end of the vehicle at a height lower than the mounting part of the hitch side member.

With the above structure of the trailer hitch, the impact load is absorbed not only by the cross member but also by the buckling deformation of the rear side member.

It is further object of the invention to provide a trailer hitch, which absorbs a large quantity of impact load or an impact load applied to a rear part of the vehicle by off-set collision, wherein each of the hitch side members the cross member installation part at the rear end thereon and a lateral reinforcement plate extending in a lengthwise direction of the vehicle along the lateral panel, the lateral reinforcement plate comprising the mounting part and a rear contact face, the mounting part at the front end of the lateral reinforcement plate and being connected to the rear portion of the rear side member, the rear contact face extending rearward from the mounting part and further extending downwardly, and the lateral panel and the lateral reinforcement plate being connected with each other.

Since the above structure of the trailer hitch comprises the hitch side member including the lateral panel and the lateral reinforcement member, it is possible to adjust the impact absorbing property of the hitch member.

Still another object of the present invention is to provide a rear structure of a vehicle which can absorb a large impact load applied thereto by a rear-end collision and to reduce the quantity of the impact load to be transmitted to the other part of the vehicle, comprising a pair of rear side members, each of the rear side members having rear support portion and an upper plane and a lower plane extending in a lengthwise direction of the vehicle, the rear side members having a hollow rectangular cross section; a trailer hitch comprising a pair of hitch side members, each of the hitch side members comprising a mounting part and a cross member installation part, the mounting part being connected to the rear support portion of the rear side members so that the cross member installation portion protrudes from the rear end of the rear side members; a cross member extending in a widthwise direction of the vehicle with ends thereof being connected to the cross member installation part; and a hitch ball member which supports a hitch ball member thereon, an upper end of the hitch ball support member being connected to the cross member at the center thereof with respect to a widthwise direction of the vehicle, and the hitch ball support member downwardly extending from the cross member.

By the above structure of the rear structure of the vehicle, the impact load is absorbed mainly by the torsion and buckling deformation of a cross member of the vehicle.

It is possible that the mounting part is connected to the rear support portion so that the cross member installation portion protrudes from the rear end of the rear side member. In that case, the impact load applied to the rear side member is offset from the axis of the rear side member, whereby the rear side member is subjected to even more effective buckling deformation.

Yet another object of the present invention is to provide a rear structure of a vehicle which can absorb a large quantity of impact load or an impact load applied to a rear part of the vehicle by off-set rear-end collision, wherein each of the hitch side members further comprises a rear contact face provided at a rear end of the vehicle at a height lower than the mounting part of the hitch side member.

With the above structure of the trailer hitch, the impact load is absorbed not only by the cross member but also by the buckling deformation of the rear side member.

A still further object of the present invention is to provide a rear structure of the vehicle which can effectively absorb an impact load applied thereto, wherein each of the hitch side members comprises a lateral panel extending in a lengthwise direction of the vehicle, the lateral panel including the cross member installation part at the rear end thereof, and a lateral reinforcement plate extending in a lengthwise direction of the vehicle along the lateral panel, the lateral reinforcement plate comprising the mounting part and a rear contact face, the mounting part positioned at the front end of the lateral reinforcement plate and being connected to the rear support portion of the rear side member, the rear contact face extending rearward from the mounting part and further extending downwardly, and the lateral panel and the lateral reinforcement plate being connected with each other.

By the above rear structure of the vehicle of the invention, the rear support portion of the rear side member is designed to positively contribute to the impact absorption. Therefore, the impact load is effectively absorbed.

A still further object of the present invention is to provide a rear structure of the vehicle, which can further efficiently absorb the impact load applied thereto by an rear-end collision, wherein the lower plane of the rear side member has a rear support portion, and the upper plane of the rear side member having a front support portion provided in front of the rear support portion with respect to the lengthwise direction of the vehicle, the front support portion and the rear support portion being spaced apart from each other, the trailer hitch further comprising a connection member having a front connection part, a rear connection part, and an extension part provided between the front connection part and the rear connection part so as to be integral with each other, the extension part extending from the rear end of the front connection part by way of a front fold, and the rear end of the extension part extending to the rear connection part by way of a rear fold.

Based on the above rear structure of the vehicle, the impact load is effectively absorbed by the buckling deformation of the connection member and the rear side member.

A still further object of the present invention is to provide a rear structure of the vehicle, which can further efficiently absorb the impact load applied thereto by an rear-end collision, wherein the extension part of the connection member comprises a front region and a rear region, the front region extending from the front connection part by way of the front fold, the rear connection part extending from the rear region by way of the rear fold, the front region and the rear region having a link part interposed therebetween, the link part having a lower rigidity comparing to that of the front region and the rear region.

Since the link part is designed to have a rigidity lower than that of the front region and the rear region in the above structure, the connection part can further effectively contribute to the buckling deformation. Therefore, the rear side member effectively absorbs the impact load applied thereto.

BRIEF DESCRIPTION OF THE DRAWINGS

A more complete appreciation of the invention and many of the attendant advantages thereof will be readily perceived as the same becomes better understood by reference to the following detailed description when considered in connection with the accompanying drawings, wherein.

DETAILED DESCRIPTION OF THE INVENTION

Other features of this invention will become apparent in the course of the following description of exemplary embodiments, which are given for illustration of the invention and are not intended to be limiting thereof.

In the following embodiments, the terms "front/frontward", "rear/rearward", "outward" and "inward" are used based on the direction of a vehicle to which the invention pertains, without otherwise being mentioned.

First Embodiment

A first embodiment of a trailer hitch and a rear structure of a vehicle provided with the trailer hitch will be explained by referring to FIGS. 1 to 13.

Figure 1:
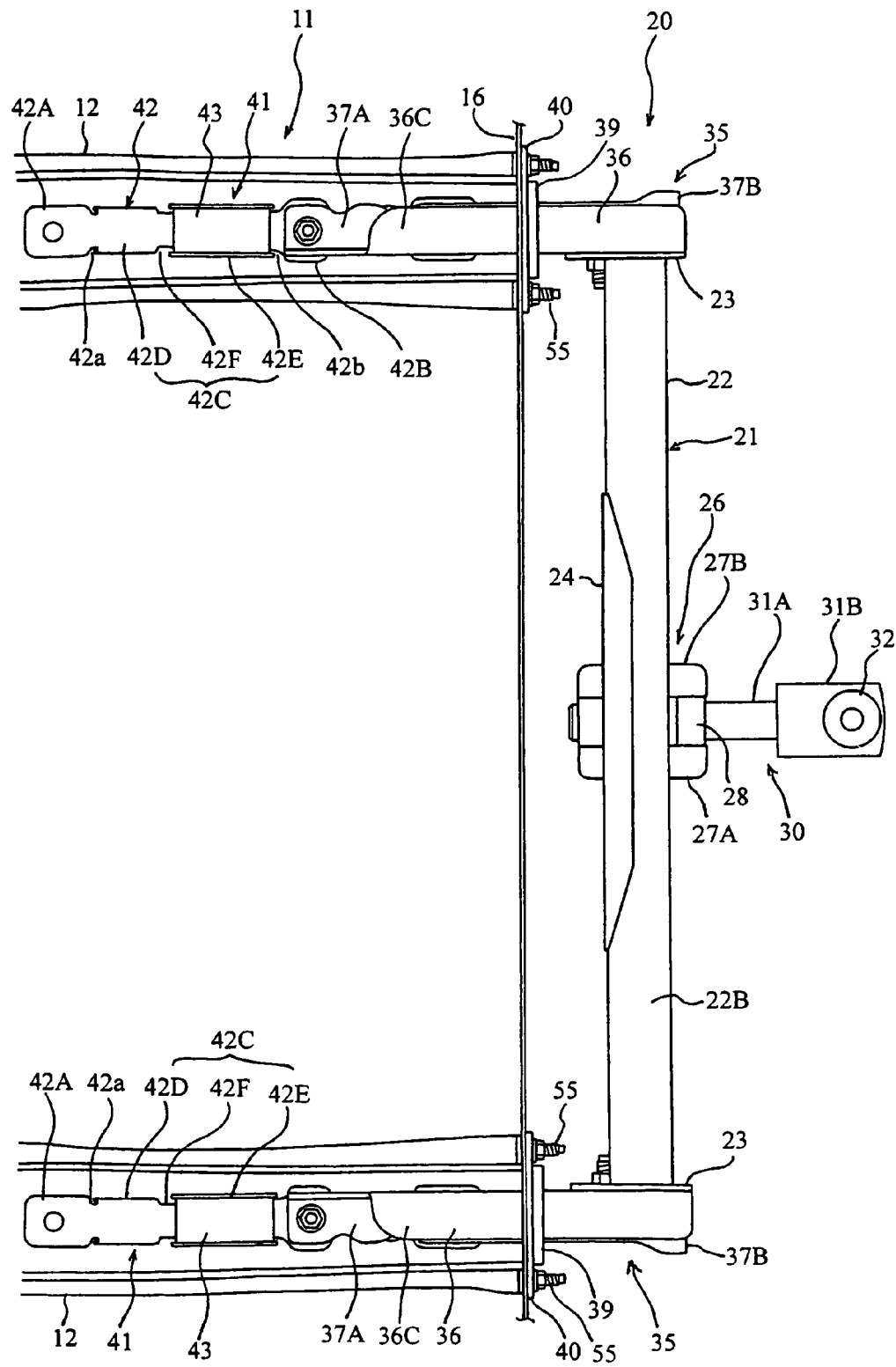
FIG. 1 is a plan view of a rear part of a vehicle having a trailer hitch of the present invention.
Figure 2:
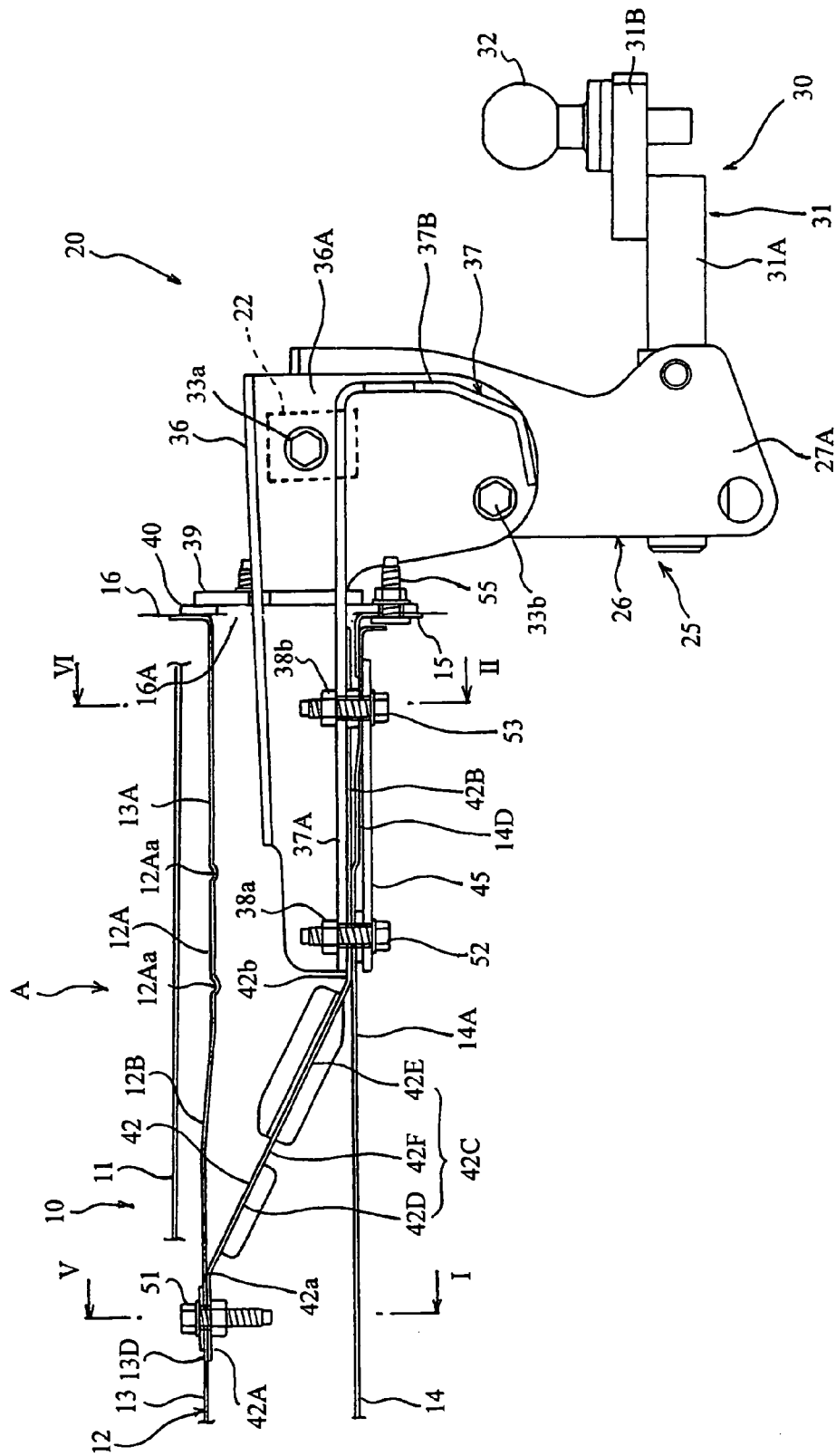
FIG. 2 is a side view of the rear part of the vehicle shown in FIG. 1.
Figure 3:
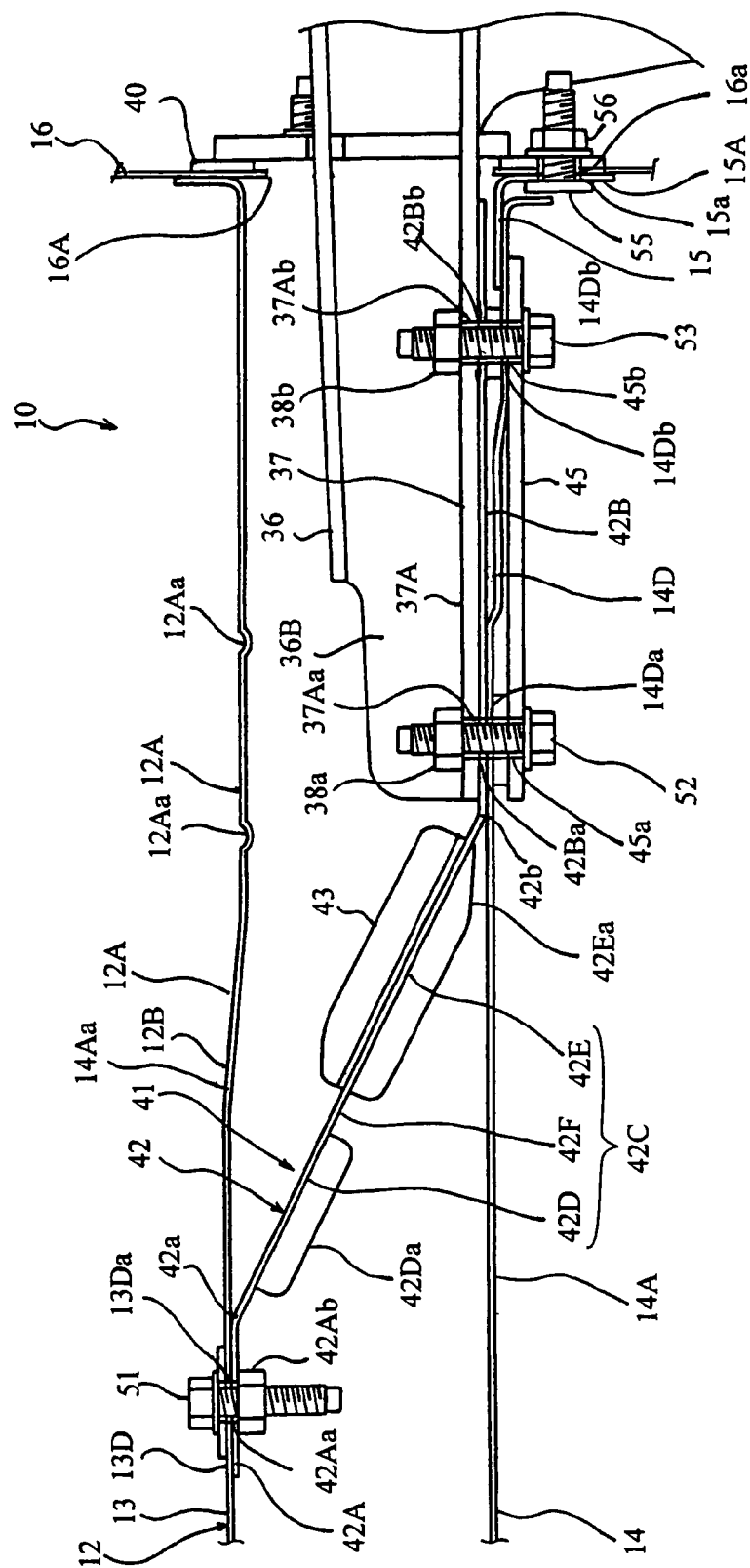
FIG. 3 is an enlarged view of the part with arrow A in FIG. 2.
Figure 4:
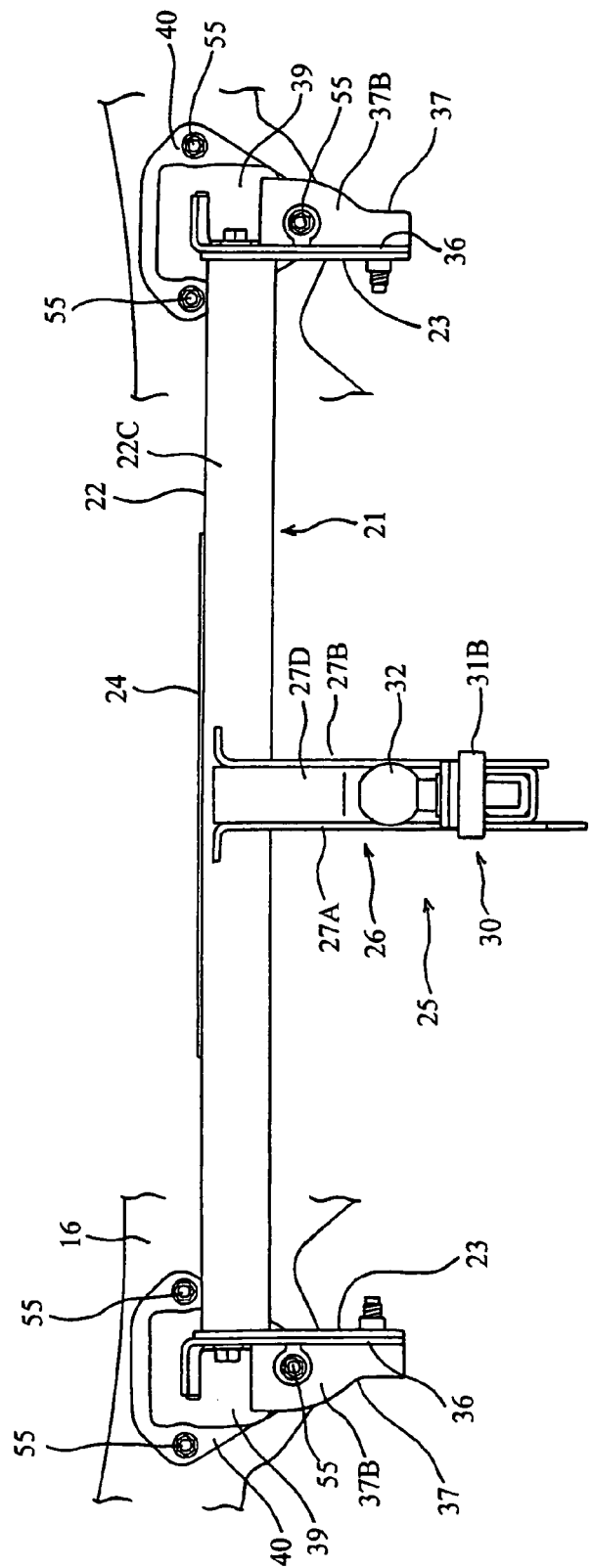
FIG. 4 is a rear elevation of the rear part shown in FIG. 1.

FIG. 1 is a plane view of a rear part of a vehicle 10 provided with a trailer hitch 20. FIG. 2 is a side view of the rear part shown in FIG. 1; FIG. 3 is an enlarged view of a part shown by arrow A in FIG. 2; and FIG. 4 is a rear elevation of the rear part shown in FIG. 1.

Figure 5:
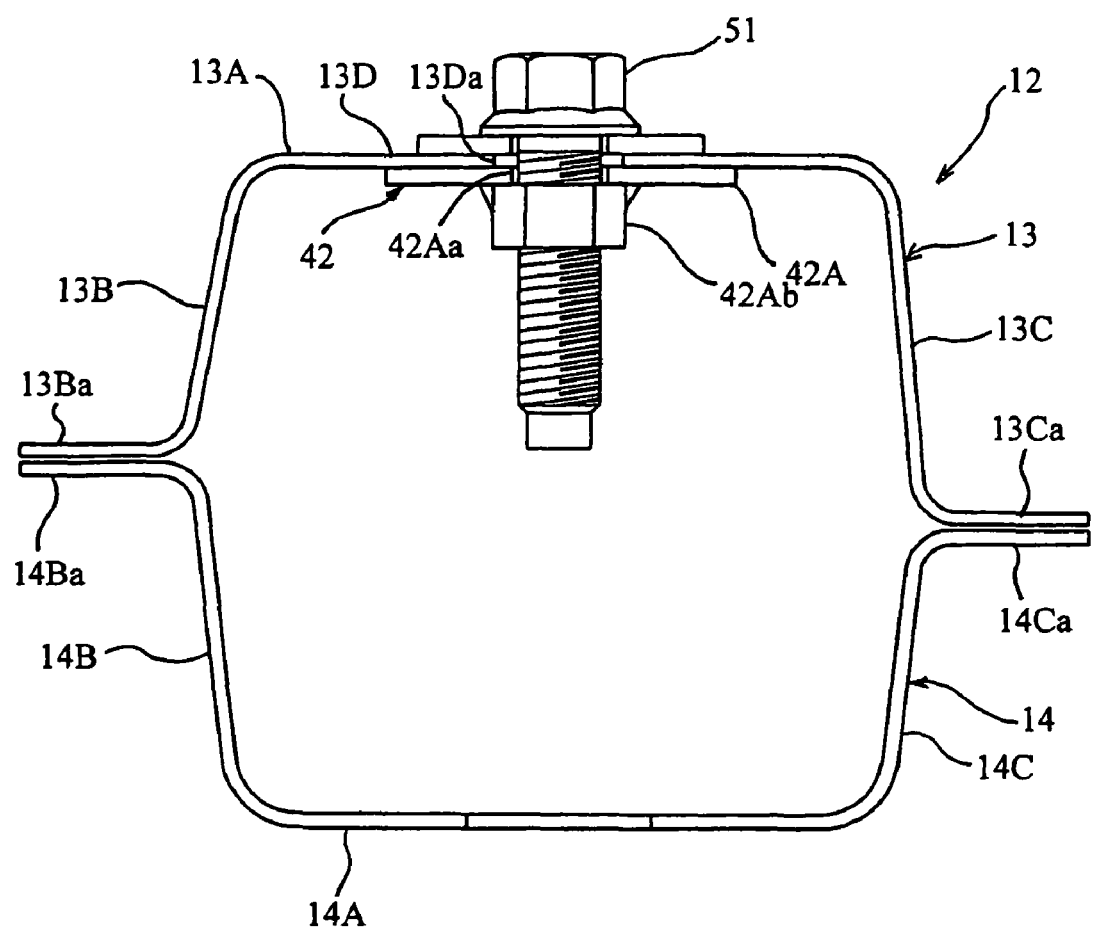
FIG. 5 is a cross section obtained by cutting the part shown in FIG. 2 along a line with arrow V therein.
Figure 6:
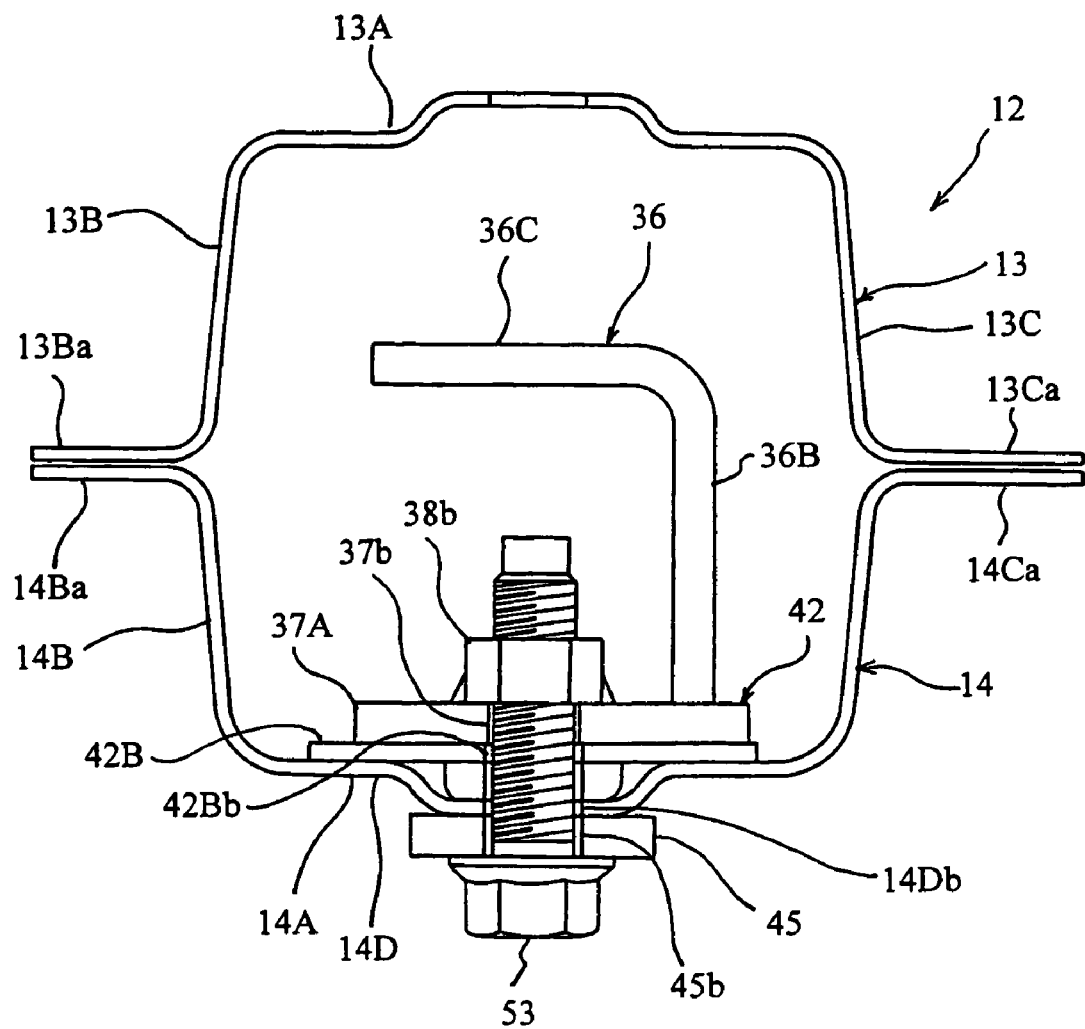
FIG. 6 is a cross section obtained by cutting the part shown in FIG. 2 along a line with arrow VI therein.

The rear part 10 is configured with rear side members 12 provided on left and right sides of a lower surface of a floor panel 11. FIGS. 5 and 6 show V-V and VI-VI cross-sectional views taken along the lines V-V and VI-VI in FIG. 3. As shown in FIGS. 5 and 6, the rear side members 12, which extend in the lengthwise direction of the vehicle, are formed as hollow members having a rectangular cross section 10. Each of the rear side members is prepared from an upper rear side member 13 and a lower rear side member 14. As shown in FIGS. 5 and 6, the upper rear side member 13 includes an upper plane 13A and lateral planes 13B and 13C downwardly extending from the ends of the upper plane 13A. Furthermore, the lateral planes 13B and 13C are provided with connection flanges 13Ba and 13Ca along the lower ends thereof. The upper plane 13A of the upper rear side member 13 has a front support portion 13D having a mounting hole 13Da therein.

The lower rear side member 14 includes a lower plane 14A and the lateral planes 14A and 14B upwardly extending from the ends of the upper plane 14A. The lower plane 14A opposes the upper plane 13A of the upper rear side member 13, and also has a rear support portion 14D.

As shown in FIGS. 2 and 3, the rear support portion 14D is provided in a rearward direction with respect to the front support portion 13D so as to have a predetermined distance therebetween. Connection flanges 14Ba and 14Ca are provided along the upper lateral ends of the lateral planes 14B and 14C. Therefore, the flanges 13Ba and 13Ca of the upper rear side member 13 are connected with the flanges 14Ba and 14Ca of the upper rear side member 14. Furthermore, a pair of mounting holes 14Da and 14Db is provided in the rear support portion 14D so as to be spaced apart from each other in the lengthwise direction of the vehicle.

The rear ends of the rear side members 12 are connected to a rear skirt 16 via connection brackets 15. The rear skirt 16 has an opening 16A configured to communicate with a space within the rear side member 13. On the other hand, a surface of each bracket 15 which contacts the rear skirt 16 (also referred to as a connection surface 15A) has mounting holes 15a provided therein. Mounting holes 16a are also provided in the rear skirt 16 so that the mounting holes 15a and 16a correspond to each other.

A trailer hitch 20 will now be explained by referring to FIGS. 7 to 12.

Figure 7:
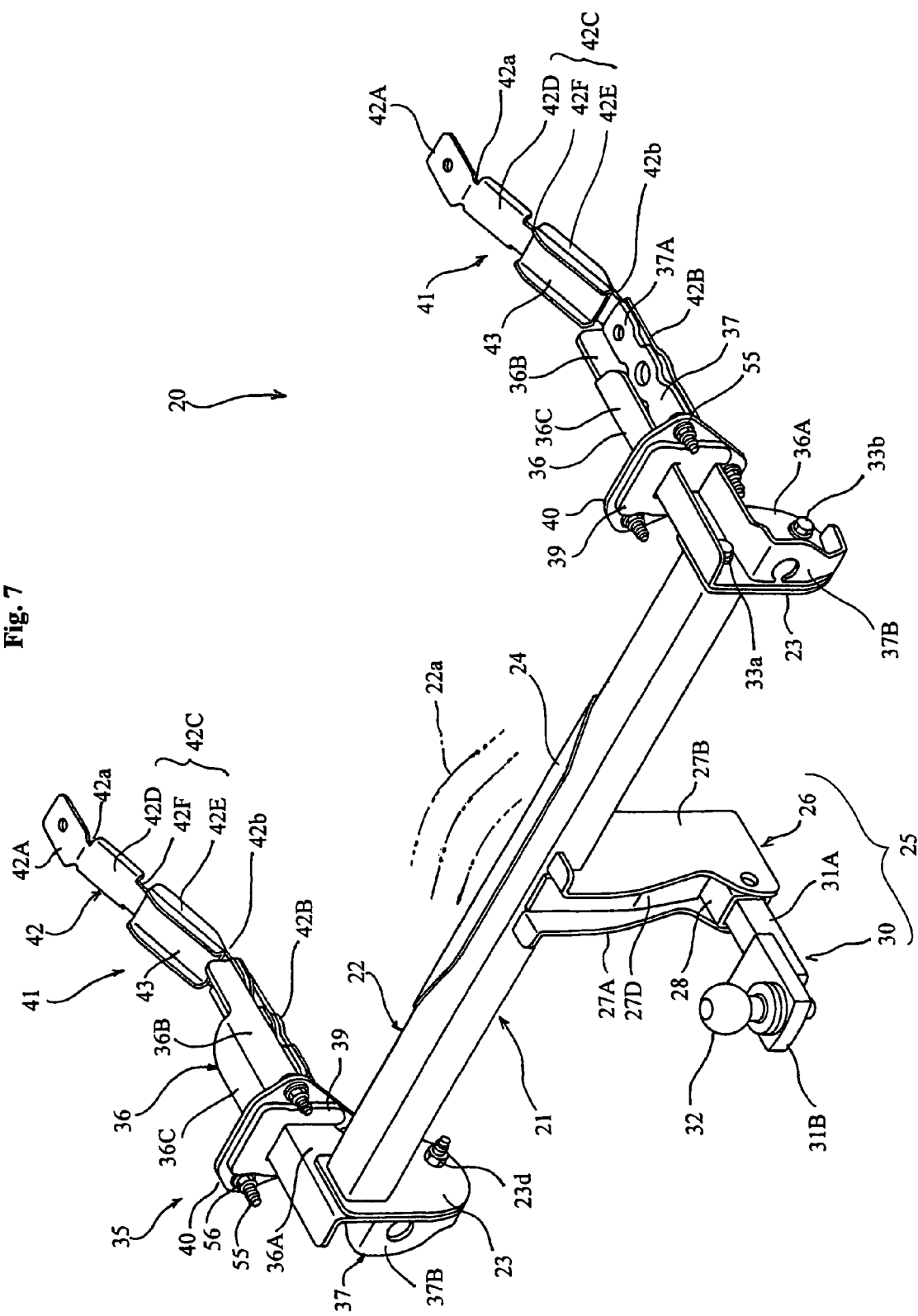
FIG. 7 is a perspective view of a trailer hitch.
Figure 8:
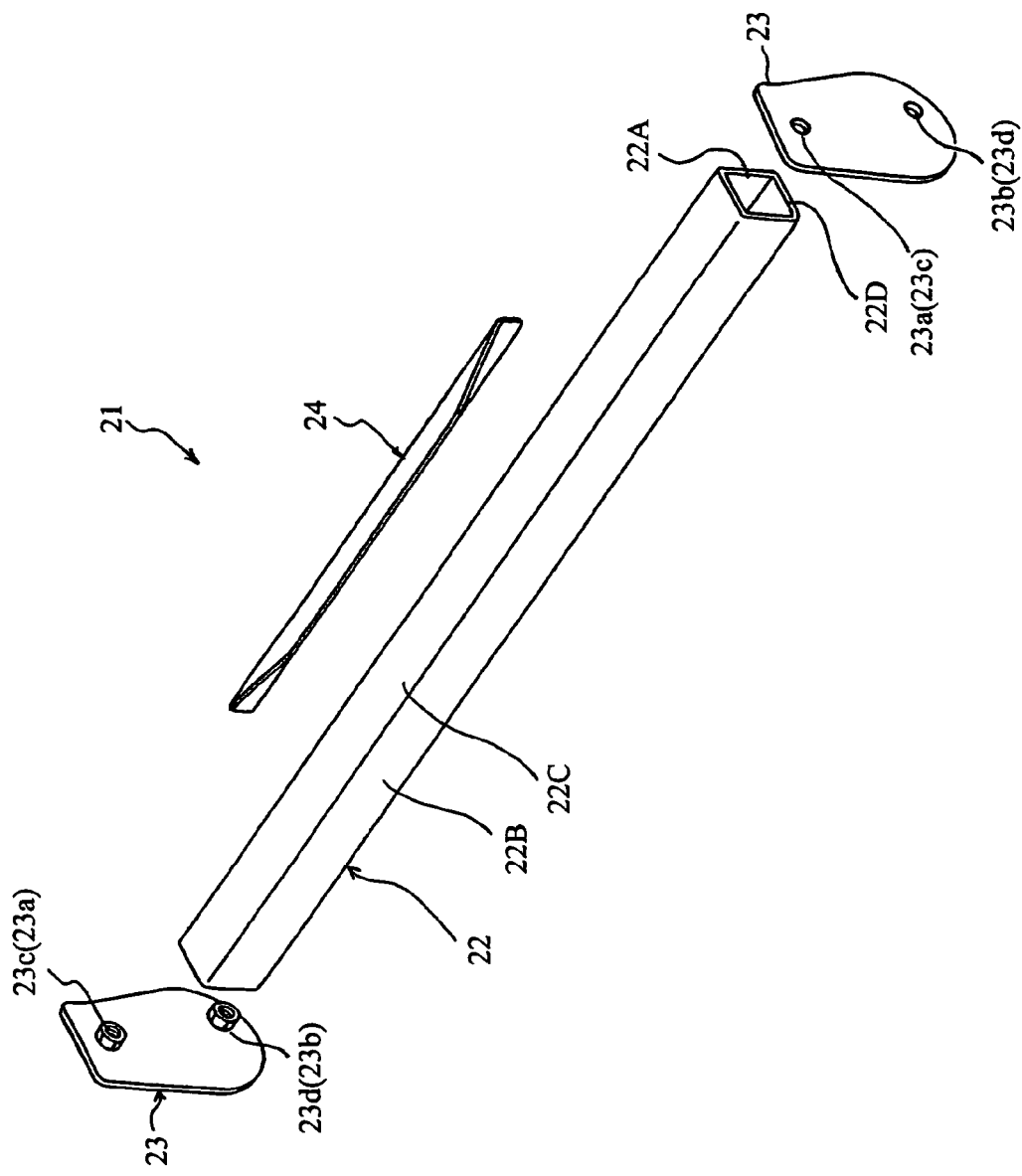
FIG. 8 is an exploded perspective view of a hitch center member of a trailer hitch.
Figure 9:
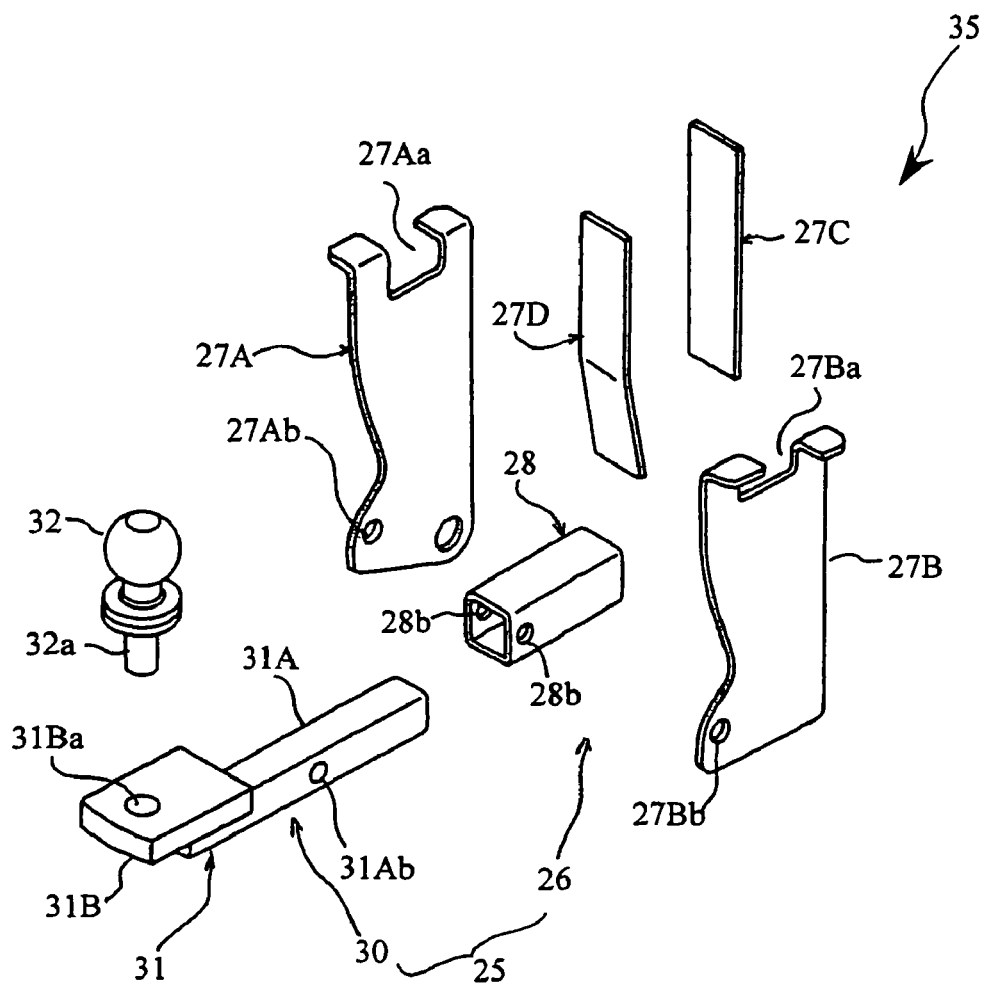
FIG. 9 is an exploded perspective view of a hitch ball support member of a trailer hitch.
Figure 10:
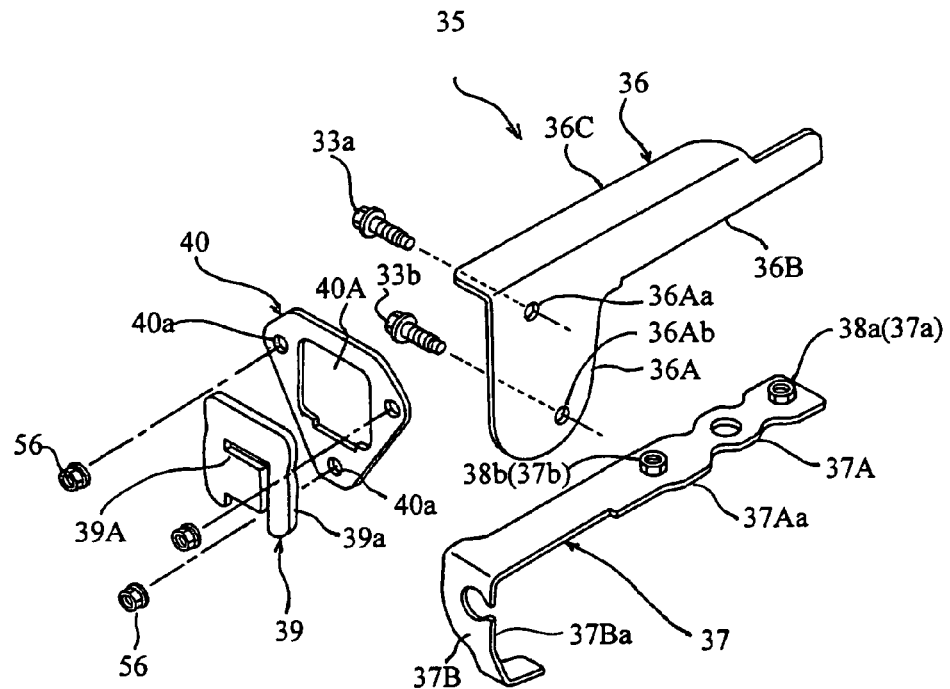
FIG. 10 is an exploded perspective view of a hitch side member of a trailer hitch.
Figure 11:
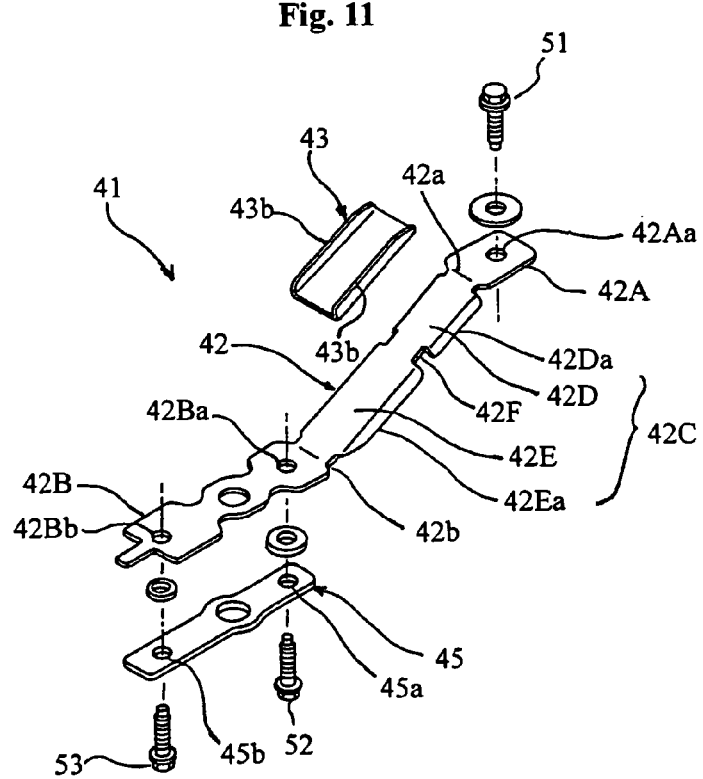
FIG. 11 is an exploded perspective view of a side plate member of a trailer hitch.
Figure 12:
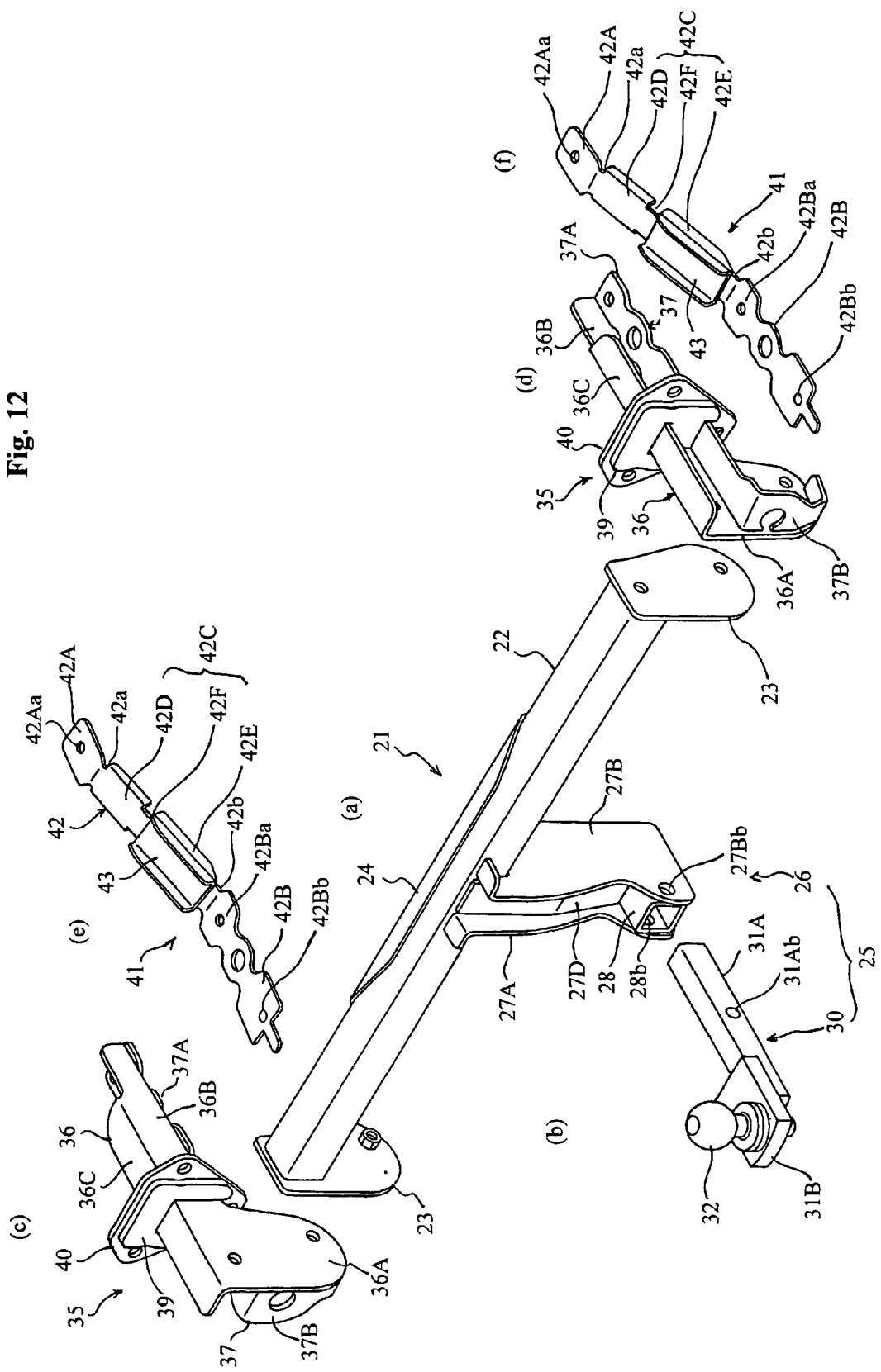
FIG. 12 is an exploded perspective view of a trailer hitch.

FIG. 7 is a perspective schematic view of the trailer hitch 20 of the present invention; FIG. 8 is an exploded perspective diagram of a hitch center member 21; FIG. 9 is an exploded perspective view of a hitch ball support member 25; FIG. 10 is an exploded perspective view of a hitch side member 35; FIG. 11 is an exploded perspective view of a side plate member 41 of a trailer hitch 20; and FIG. 12 is an exploded perspective view of the trailer hitch 20.

FIG. 8 shows that the hitch center member 21 of the trailer hitch 20 includes a cross member 22, a pair of cross member brackets 23 configured to be connected to the cross member 22, and a cross member reinforcement element 24.

The cross member 22 is a hollow member which extends in a widthwise direction of the vehicle. The cross member 22 includes a front wall 22A, rear wall 22B, top wall 22C and bottom wall 22D so as to configure a hollow rectangular cross section. Each of the cross member brackets 23 is in the form of a plate having a circular protrusion at a lower part thereof. The cross member brackets 23 are attached to ends of the cross member 22 so as to close the ends of the hollow cross member 22. Upper and lower parts of the cross member brackets 23, respectively, have mounting holes 23a and 23b, and nuts 23c and 23d are provided in the holes 23a and 23b.

The cross member reinforcement element 24 is a planer member extending in a widthwise direction of the vehicle, and has an L-shape cross section. The cross member reinforcement element 24 is provided at the center of the cross member 22 with respect to the widthwise direction of the vehicle, and is connected to the cross member so as to cover the front and top walls 22A and 22C. Depending on the specification or requirement for the vehicle, it is possible to adjust the thickness, length and shape of the cross member reinforcement element 24 to provide for obtaining an appropriate reinforcement of the cross member 22.

As shown in FIG. 7, a hitch ball support member 25 is provided on the cross member 22 at the center position thereof with respect to a widthwise direction of the vehicle. The hitch ball support member 25 includes a hitch ball support arm 26 and a hitch ball member 30. The hitch ball support arm 26 is connected to the cross member and downwardly extends therefrom.

More precisely, FIG. 9 shows that the hitch ball support arm 26 is formed by a pair of side plates 27A and 27B, and front and rear plates 27C and 27D inserted between the side plates 27A and 27B, so as to have a rectangular hollow cylindrical shape. The side plates 27A and 27B, respectively, have concave fitting cutouts 27Aa and 27Ba at the top parts thereof. Further, the side plates 27A and 27B, respectively, have retaining holes 27Ab and 27Bb therein at lower parts thereof.

By use of the fitting cutouts 27Aa and 27Ba, the hitch ball support arm 26 is connected to the lower part of the cross member 22. (FIG. 7). Then, the hitch ball support arm 26 is firmly connected to the cross member 22 by welding.

A rectangular, hollow hitch support cylinder 28 is inserted into a lower space between the side plates 27A and 27B. Retaining holes 28b are provided in the hitch support cylinder 28 at positions corresponding to the retaining holes 27Ab and 27Bb of the side plates 27A and 27B.

The hitch ball member 30 comprises a ball mount 31 and a hitch ball 32. The hitch ball member is inserted into the hitch support cylinder 28 to fabricate the hitch ball support member 25.

The ball mount 31 comprises a support shaft 31A and a hitch ball support part 31B connected to a rear part of the support shaft 31A. p The support shaft 31A has retaining holes 31Ab provided therein which correspond to the retaining holes 28b in the hitch support cylinder 28. The hitch ball 32 has a leg 32a, and the hitch ball support part 31B has a support hole 31Ba. In this configuration, the hitch ball 32 is supported by the ball mount 31 by inserting the leg 32a into the support hole 31Ba.

The hitch ball member 30 is installed into the hitch ball support arm 26 by inserting the support shaft 31A into the hitch support cylinder 28, and then by inserting a hitch pin (not shown) through the retaining holes 27Ab and 27Bb in the side plates 27A and 27B, retaining holes 28b in the hitch support cylinder 28 and retaining holes 31Ab of the support shaft 31A.

A pair of hitch side members 35 is provided at the ends of the cross member 22 (FIG. 7). FIG. 10 shows a hitch side member 35 including a lateral panel 36, lateral reinforcement member 37, closure panel 39, and installation bracket 40.

The lateral panel 36 includes a cross member installation part 36A, insertion part 36B, and flange part 36C as an integral member. The installation part 36A is a rear portion of the lateral panel 36 for superimposing on the cross member bracket 23 of the hitch center member 21. The installation part 36A has a shape similar to that of the cross member bracket 23. The insertion part 36B extends from the front upper part of the cross member installation part 36A in a frontward direction of the vehicle. The flange part 36C defines a horizontal plane which extends at approximately a right angle with the installation part 36A and the insertion part 36B, approximately. The flange part 36C has a free lateral ends facing to the outside with respect to the widthwise direction of the vehicle.

The cross member installation part 36A has mounting holes 36Aa and 36Ab corresponding to the mounting holes 23a and 23b in the cross member bracket 23.

The lateral reinforcement plate 37 has a mounting part 37A and a rear contact face 37B. The mounting part 37A is a plate-shaped with a horizontal plane extending in a lengthwise direction of the vehicle. The rear contact face 37B extends from the rear end of the mounting part 37A, and is configured to extend in a downward direction, and then in a frontward direction.

For the installation, the mounting part 37A is arranged below the flange part 36C of the lateral panel 36 so as to have the horizontal plane of the mounting part 37A approximately in parallel with the flange part 36C. The mounting part 37A is positioned at the height of the lower end of the insertion part 36B. In this state, the lateral panel 36 and the lateral reinforcement plate are connected with each other by welding the mounting part 37A to the cross member installation part 36A. Moreover, an inner lateral end 37Ba of the rear contact face 37B is welded to an outer surface of the cross member installation part 36A.

The mounting part 37A has mounting holes 37a and 37b which correspond to the previously explained mounting holes 14Da and 14Db provided perforated in the rear support portion 14D of the lower rear side member 14 (FIG. 2). Nuts 38a and 38b are inserted into the mounting holes 37a and 37b from an upper side of the mounting part 37A.

The closure panel 39 is a rectangular plate having a U-shaped cutout 39A. The mounting part 37A of the lateral reinforcement plate 37, and the insertion part 36B and the flange part 36C are inserted into the U-shaped cutout 39A. The closure panel 39 is attached in front of the cross member installation part 36A, with respect to the lengthwise direction of the vehicle. Therefore, the lateral panel 36 and the lateral reinforcement plate 37 are appropriately positioned with respect to each other. Then, the closure panel 39 and the mounting part 37A are welded together as are the insertion part 36B and the flange part 36C.

The installation bracket 40 has an opening 40A through which the mounting part 37A, insertion part 36B and flange part 36C are received. The installation bracket 40 has a contour 39a for closing the opening 16A of the rear skirt 16. In addition to the above, the installation bracket 40 has a plurality of mounting holes 41a corresponding to the mounting holes 16a of the rear skirt 16.

The installation bracket 40 is superimposed on a front surface of the closure panel 39 with the opening 40A closed by the closure panel 39. In this state, the installation bracket 40 is welded to the outer periphery of the closure panel 39 and the lower surface of the lateral reinforcement plate 37.

Thus, the hitch side member 35 is provided by combining the lateral panel 36, lateral reinforcement member 37, closure panel 39 and installation bracket 40.

For mounting the hitch side members 35 on the cross member brackets 23 of the hitch center member 21, the cross member installation parts 36A are superimposed on the cross member brackets 23. Thereafter, bolts 33a, 33b are inserted first to the mounting holes 36Aa and 36Ab of the cross member installation parts 36A and then the mounting holes 23a and 23b of the cross member brackets 23 to screw into the nuts 23c and 23d (FIGS. 7 and 10).

Accordingly, the trailer hitch 20 is provided from the hitch center member 21, hitch ball member 30 and hitch side member 35 which are firmly connected with each other.

FIG. 11 shows a side plate member 41, which includes a connection member 42, a connection-reinforcement member 43, and a rear mount reinforcement member 45. The center connection member 42 is to be provided between the previously explained front support portion 13D of the upper rear side member 13 and the rear support portion 14D of the lower rear side member 14.

The center connection member 42 includes front and rear connection parts 42A and 42B and an extension part 42C provided between the front and rear connection parts 42A and 42B, as an integral member. In other words, the extension part 42C extends from the rear end of the front connection part 42A by way of a front fold 42a, and the rear end of the extension part 42C extends to the front end of the rear connection part 42B by way of a rear fold 42b.

As can be seen from FIGS. 2 and 3, the front and rear connection parts 42A and 42B are respectively connected to the upper support portion 13D and the rear support portion 14D. The extension part 42C of the connection member 42 is installed in the rear side member 12 so as to be downwardly inclined in a rearward direction of the vehicle.

Referring back to FIG. 11, the front connection part 42A is substantially in the form of a plate-shaped having a mounting hole 42Aa provided therein. The front connection part 42A is positioned to contact with a lower surface of the front support portion 13D. As shown in FIGS. 3 and 5, a nut 42Ab is provided on the lower surface of the front connection part 42A at a position corresponding to the mounting hole 42Aa of the connection part 42A and the mounting hole 13Da of the front support portion 13D.

The rear connection part 42B is substantially in the form of a rectangular-shaped plate having mounting holes 42Ba and 42Bb therein. The rear connection part 42B is positioned to contact with an upper surface of the rear support portion 14D. In this state, the rear connection part 42B extends in a lengthwise direction of the vehicle, and the mounting holes 42Ba and 42Bb communicate with the mounting holes 14Da and 14Db of the rear support portion 14D (FIGS. 3 and 6).

As shown in FIG. 11, the extension part 42C has a front region 42D and a rear region 42E. The front region 42D has flanges 42Da at both the lateral ends thereof. The flanges 42Da are formed so as to have the free lateral ends facing a downward direction. By the provision of the flanges 42Da, the rigidity of the front region 42D is improved.

Likewise, the rear region 42E has flanges 42Ea at both the lateral ends thereof. The flanges 42Ea are formed so as to have the free lateral ends facing a downward direction. By the provision of the flanges 42Ea, the rigidity of the front region is improved.

The rear region 42E extends from the rear end of the front region 42D, and a relatively weak link part 42F is provided therebetween. Namely, the rigidity of the front and rear regions 42D and 42E is made greater than that of the link part 42F.

Moreover, the previously discussed connection-reinforcement member 43 is mentioned connecting-reinforcement member 43 is used for reinforcing the front region 42D. The connection-reinforcement member 43 is in the form of a substantially rectangular plate having flanges 43a at the both ends of the plate. The connection-reinforcement member 43 is provided on an upper surface of the rear region 42E so that free lateral ends of the flanges 43 are directed upwardly.

The rear mount reinforcement member 45 is substantially in the form of a plate-shaped with having mounting holes 45a and 45b provided therein. The reinforcement member 45 is provided on the lower surface of the rear support portion 14D so that the mounting holes 45a and 45b communicate with the mounting holes 14Da and 14Db in the rear support portion 14D.

The operation of attaching the trailer hitch 20 to the rear part of the vehicle 10 will now be explained.

Prior to the attaching operation of the trailer hitch 20, the side plate member 41 obtained by combining the connection member 42 and the connection-reinforcement member 43 is inserted into the space within the rear side member 13. The side plate member 41 is introduced from the side of the front connection part 42A through the opening 16A of the rear skirt 16 provided at the rear side of the vehicle 10. Thereby, the front connection part 42A and the rear connection part 42B are superimposed on the lower surface of the front support portion 13D and the upper surface of the rear support portion 14D, respectively. A rear end of the flange 42Ea is provided in the vicinity of the lower plane 14A of the lower rear side member 14.

In the state where the front support portion 13D of the upper rear side member 13 is superimposed on the front connection part 42A of the connection member 42, a bolt 51 is inserted in to the mounting hole 13Da of the front support portion 13D and then mounting hole 42Aa to screw into the nut 42b. Thus, the front connection part 42A of the connection member 42 is fastened to the front support portion 13D.

The hitch side member 35 previously assembled from the lateral panel 36, lateral reinforcement plate 37, closure panel 39 and installation bracket 40 is introduced into the rear side member 12.

Namely, the insertion part 36B of the lateral panel 36 and the mounting part 37A of the lateral reinforcement plate 37 are introduced into a space within the rear side member 12 from the opening 16A of the rear skirt 16. Thus, the mounting part 37A is provided on the upper surface of the rear connection part 42B. Then, the installation bracket 40 is connected with the rear skirt 16. Accordingly, the trailer hitch 20 is appropriately positioned with respect to the rear part 11 of the vehicle.

After the trailer hitch 20 has been positioned at the rear part 11 of the vehicle, the rear mount reinforcement member 45 is superimposed on the lower plane 14A in the lower rear side member 14, as shown in FIGS. 2 and 3. Then, a bolt 52 is inserted to successively into the mounting hole 45a of the rear mount reinforcement member 45, the mounting hole 14Da of the rear support portion 14D, the mounting hole 42Ba of the rear connection part 42B, and the mounting hole 37Aa in the lateral reinforcement plate 37. Then, the bolt 52 is screwed into the nut 38a. Likewise, a bolt 53 is inserted to successively into the mounting hole 45b of the rear mount reinforcement member 45, the mounting hole 14Db of the rear support portion 14D, the mounting hole 42Bb of the rear connection part 42B, and the mounting hole 37Ab in the lateral reinforcement plate 37. In this state, the bolt 53 is screwed into the nut 38b.

Thus, the rear mount reinforcement member 45, rear support portion 14D of the lower rear side member 14, rear connection part 42B of the connection member 42, and mounting part 37 of the lateral reinforcement plate 37 are fastened together by bolts 52 and 53. The above-connection provides a large quantity of rigidity and connection between the rear support portion 14D and the mounting part 37A of the lateral reinforcement plate 37.

Due to the reinforcement of the rear support portion 14D by the lateral panel 36, lateral reinforcement plate 37 and rear mount reinforcement member 45, a first bend part 12A is formed around the rear support portion 14D, preferably at a front end of the rear support portion 14D. Namely, the rigidity or the reinforcement of the rear side member 12 changes at the first bend part 12A. It is possible to form beads 12Aa at the first bend part 12A extending in a widthwise direction of the vehicle, if necessary, which have less rigidity comparing to the other part of the rear side member 12.

Moreover, a second bend part 12B, which will be explained below in detail, is provided between the front support portion 13D and the rear support portion 14D at a region corresponding to the link part 42F formed in the connection member 42 (FIG. 3). The second bend part 12B is positioned at a position in a frontward direction with respect to the first bend part 12A.

The connection bracket 15, the rear skirt 16 and the installation bracket 40 are fastened all together by a bolt 55, which is inserted through the mounting holes 15a, 16a and 40a provided in the connection bracket 15, rear skirt 16 and installation bracket 40, respectively, and is screwed to a nut 56. Then, the hitch side member 35 of the trailer hitch 20 is connected to the rear end of the rear side member 12.

Thus, the trailer hitch 20 is firmly mounted on the rear part of the vehicle 10 with the above-described reinforcement.

The trailer hitch 20, as mounted on the rear part of the vehicle, has the cross member 22 at a height which is approximately the same as the height of the center axis of the rear side member 12.

As shown in FIG. 2, the rear contact face 37B of the lateral reinforcement plate 37 is provided at a height lower than the rear support portion 14D. In other words, the rear contact face 37B and the hitch ball 32 are provided approximately at the height of the bumper of the vehicle.

In FIG. 12 as an exploded perspective view, the structure and the arrangement of the trailer hitch 20 is described, which includes the hitch center member 21, hitch ball support member 25, right and left hitch side member 35, and right and left lateral plate member.

The trailer hitch 20 receives a traction load by towing a trailer or the like. With the structure of the trailer hitch 20 according to the present invention, the traction load is received and absorbed by the trailer hitch 20, and also effectively dispersed from the trailer hitch 20 to the entire vehicle body by way of the rear side members 12. In the present invention, the excellent distribution of the load is achieved based on the structure obtained by connecting the mounting part 37A of the lateral reinforcement member 37, the rear support portion 14D of the lower rear side member 14 and the installation bracket 40 included in the hitch side member 35.

When the trailer hitch 20 receives an impact load, for example, by a rear-end collision, the impact load is absorbed by the trailer hitch 20 and the rear part 10 of the vehicle.

FIGS. 13A to 13D are diagrams for explaining the impact absorbing effect obtained by the trailer hitch 20 mounted on the rear part 10 of the vehicle, which is an exemplary embodiment of the present invention.

Figure 13A:
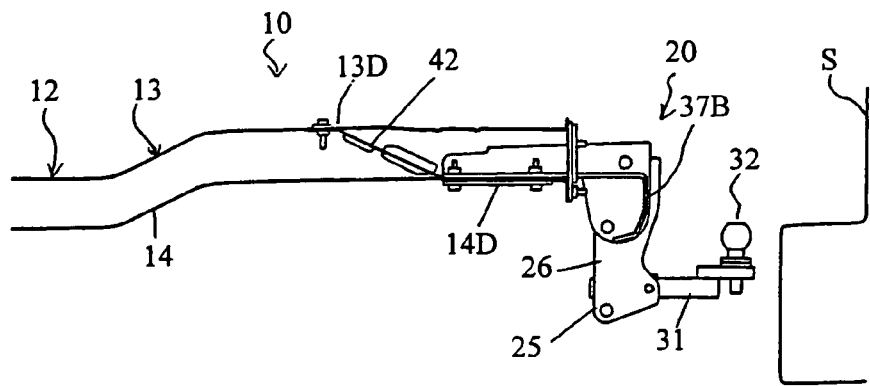
FIGS. 13A to 13D are diagrams for explaining the function of a trailer hitch of the present invention.

In FIG. 13A, the rear part 10 of the vehicle and the trailer hitch 20 are maintained in a normal state. In the normal state, it is possible that a substance such as an automobile S collides with the rear part 10 of the vehicle according to the present invention. In such a case, the automobile S collides against the hitch ball 32.

Figure 13B:
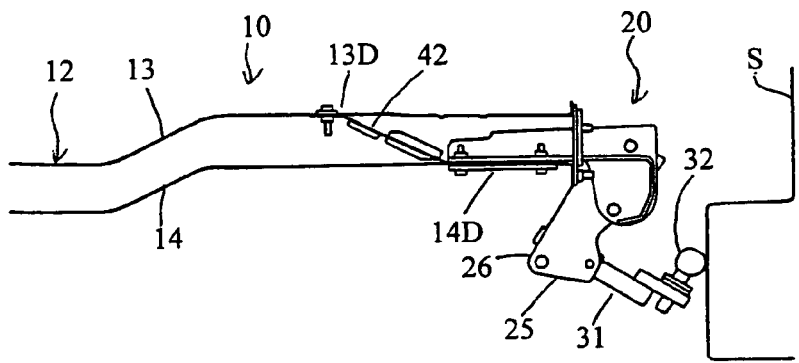
Figure 13C:
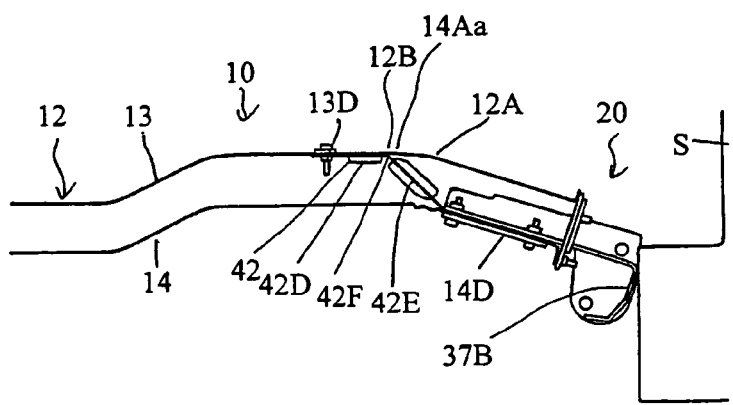

FIG. 13B shows that the state of the trailer hitch 20, when the automobile S is in contact with the hitch ball 32. When a large impact load is applied to the hitch ball 32 by the rear-end collision, the hitch ball 32 is pressed in a frontward direction, and hence the hitch ball support member 25, which is downwardly extended from the cross member 22, rotates in a frontward direction. By the rotational movement of the hitch ball support member 25, the cross member 22, particularly the center part of the cross member 22 is subjected to buckling deformation to have a torsion as shown in by imaginary lines 22a in FIG. 7.

According to the torsion and the buckling deformation, the cross member 22 absorbs the impact load transmitted from the hitch ball 32 to decrease the impact load to be transmitted to the other part of the rear part 10 of the vehicle.

In addition to the above, it is possible to adjust the impact absorbing property of the cross member 22, which is attained by the torsion and the buckling deformation thereof. Specifically, the impact absorbing property can be easily controlled, based on experiments and simulation, by appropriately choosing the length of the hitch ball support member 25 and the thickness, length, or the shape of the cross member reinforcement element 24.

In the present invention, the members of the trailer hitch 20 including the hitch side member 35 are effectively protected from being damaged because the impact load is absorbed mostly by the cross member 2. Therefore, it is possible to repair the trailer hitch 20 by a simple adjustment or exchange, for example, of the hitch center member 21 and the hitch ball member 30.

On the other hand, it would happen that an excessively large impact load is applied to the hitch ball 32, and that the cross member 22 is unable to absorb the load only by the torsion and the buckling deformation thereof. In that case, a part/parts of the automobile S, for example, a bumper will also collide against the rear contact face(s) 37B, which is located at the rear end of the lateral reinforcement plate 37. Moreover, when the automobile S collides with the vehicle having the trailer hitch 20 of the invention at a bias angle (offset collision), the automobile S collides against the rear contact surface 37B without contacting the hitch ball 32.

In the above-mentioned collisions, it is possible that the lateral reinforcement plate 37 is pressed in a frontward direction of the vehicle. Then, the impact load input to the rear contact surface 37B is transmitted to the rear support portion 14D of the lower rear side member 14 by way of the lateral reinforcement plate 37 and the lateral panel 36, and also to the rear end of the rear side member 12 via the installation bracket 40.

Owing to the configuration of the rear contact surface 37B, which is provided at a height lower than that of the rear support portion 14D, the impact load is received at a position which is offset from the axis of the rear side member 12. Namely, an offset load is applied to the rear support portion 14D of the rear side member 12.

Because of the offset load application, the rear side member 12 is subjected to buckling deformation, especially at a first bend part 12A, which is prepared at a position corresponding to the front end of the rear support portion 14D. As described in FIG. 13C, a part of the rear side member 12, which is the part located in a rearward direction with respect to the first bend part 12A (rear part), is moved slightly in a frontward direction. Simultaneously, the rear part is brought in a downward direction together with the lateral panel 36 and the lateral reinforcement member 37. By the buckling deformation of the rear side member 12, the impact load applied to the rear contact face 37B is effectively absorbed by the rear side member 12, and a minimum impact is transmitted to the other part of the vehicle.

Since the rear support portion 14D is moved in a frontward direction because of the buckling deformation at the first bend part 12A, the connection member 42 is bent at the front fold 42a, rear fold 42b and the weak prepared link part 42F. The deformation is carried out by the aid of the connection between the front connection part 42A and the front support portion 13D of the upper rear side member 13, and the connection between the rear connection part 42B and the rear support portion 14D of the lower rear side member 14.

The connection member 42 is subjected to the bending deformation, wherein the link part 42F is lifted toward the upper plane 13A of the upper rear side member 13 by the deformation at the front fold 42a, rear fold 42b and the link part 42F. Here, the bending deformation is carried out because the lower plane 14A of the lower rear side member 14 presses a rear end of the flange 42Ea, which is prepared at the rear region 42E of the connection member 42, in an upward direction.

When a large impact load applied to the rear contact surface 37B is too large for the rear side member 12 to completely absorb only by the buckling deformation, the rear contact surface 37B is further pressed in a frontward direction by the automobile S. In accordance with the frontward movement of the rear contact surface 37B, the support portion 14D of the lower side member 14 is also pressed in a frontward direction of the vehicle.

Figure 13D:
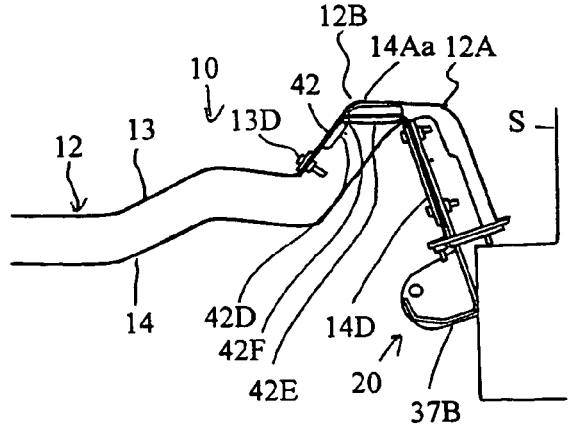

FIG. 13D is a diagram for showing the rear side member 12 of which rear support portion 14D is moved in a frontward direction. In the figure, the link part 42F of the connection member 42 is in contact with the upper plane 13A of the upper rear side member 13. More concretely, the link part 42F is in contact with a middle part 14Aa which is a part between the front support portion 13D and the rear support portion 14D. Then, the link part 42F is further lifted in an upward direction and then the middle part 14Aa is also brought in an upward direction. Consequently, the rear side member 12 is subjected to buckling deformation mainly at the front support portion 13D, in particular at the second bend part 12B provided between the front support portion 13D and the rear support portion 14D.

Because of the buckling deformation at the second bend part 12B, the rear side member 12 absorbs the remaining impact load, which was not absorbed by the deformation of the first bend part 12. Namely, in the present invention, an impact load is sequentially absorbed by the rear side member 12 by the provision of the first and the second bend parts 12A. Such configuration contributes to restrict the maximum load value. As a result, it is possible to eliminate or minimize the impact load applied to a person in the vehicle according to the present invention.

As described above, the structure and the arrangement of the trailer hitch 20 or the rear structure of the vehicle including the trailer hitch 20 effectively absorb the impact load, and minimize the impact load to be transmitted to the other part of the vehicle.

This effect of the present invention can be attained because the trailer hitch 20 and the rear part 10 having the trailer hitch 20 are designed to impart torsion or buckling deformation to the cross member 22 and the buckling deformation of the rear side member 12.

Moreover, the hitch side member 35 for use in the invention is assembled from separately formed members, i.e., the lateral panel 36, lateral reinforcement plate 37, closure panel 39 and installation bracket 40. These members are easily formed because of the simple shapes, whereby excellent production of these can be carried out. In addition, it is possible to adjust the shape or plate thickness of the members used for preparing the hitch side member 35, depending on the specification of the vehicle.

Second Embodiment

A second embodiment of a trailer hitch and a rear structure of a vehicle having a trailer hitch will be explained by referring to FIG. 14. In the second embodiment, a side plate member 61 is different from the rear side plate member 41, and a second bend part 12C is formed at a different position from the second bend part 12B in the first embodiment. In the second embodiment, the explanation is omitted, as to the members/structures which are the same as those in the first embodiment. The same reference numerals are used for the common members between FIG. 14 and FIGS. 1 to 12.

Figure 14:
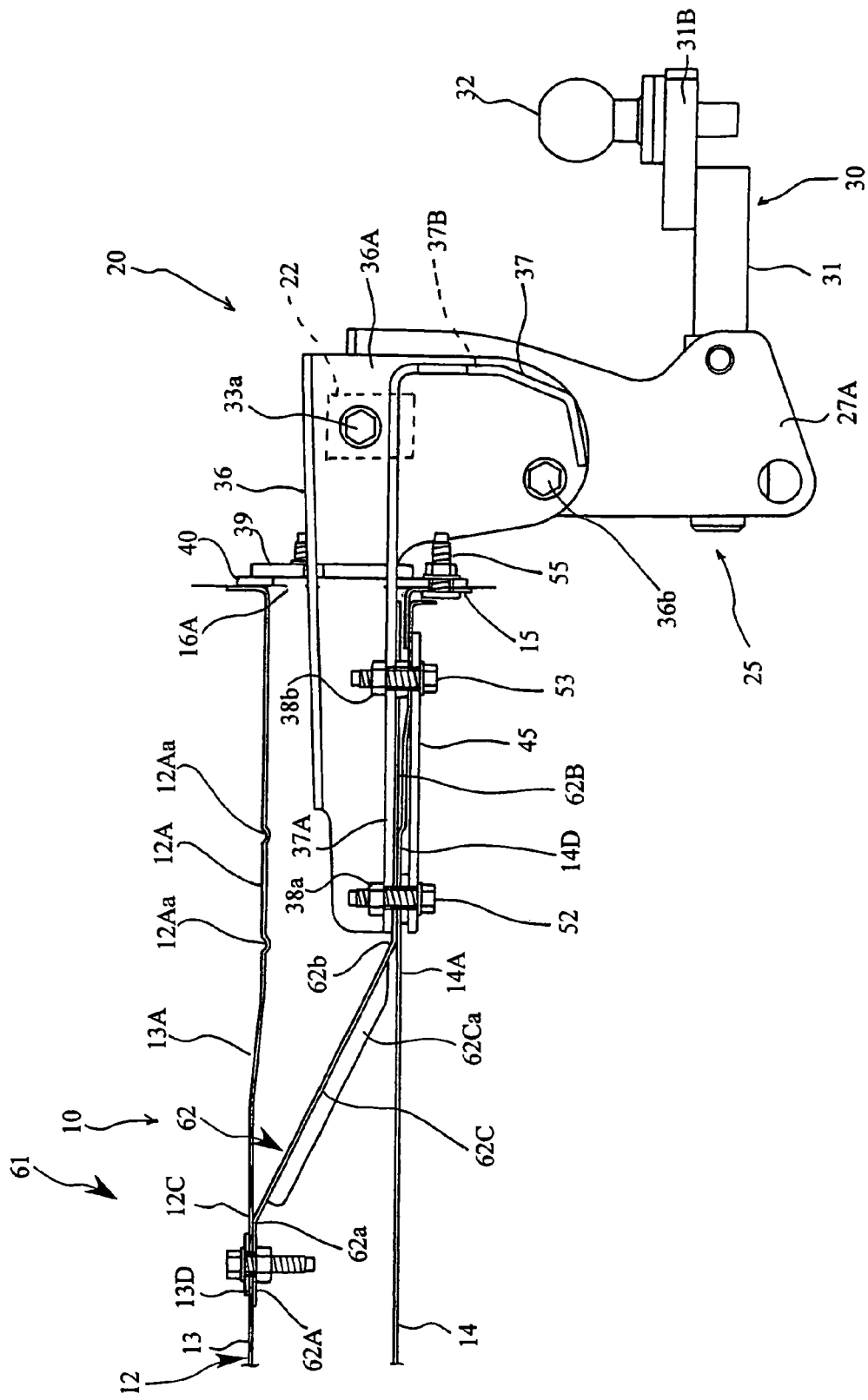
FIG. 14 is a side view of a rear part of a vehicle having a trailer hitch of the present invention.
Figure 15:
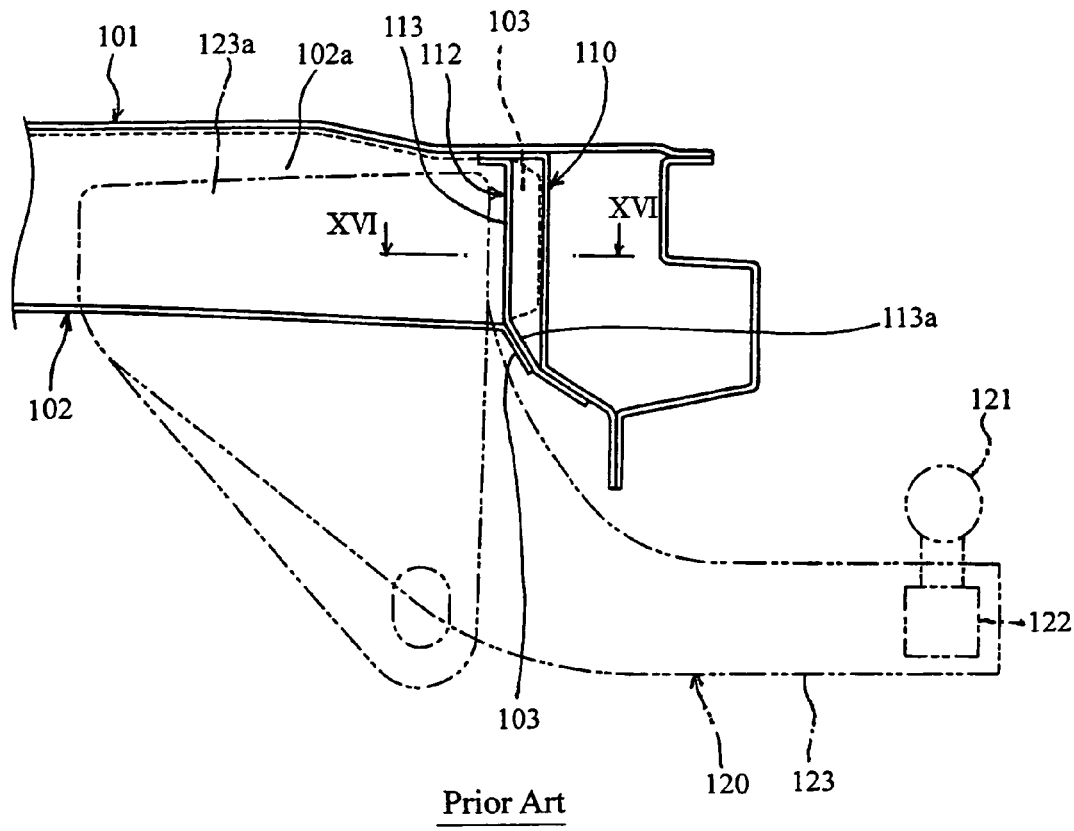
FIG. 15 is diagram for a rear structure of a vehicle having a trailer hitch.
Figure 16:
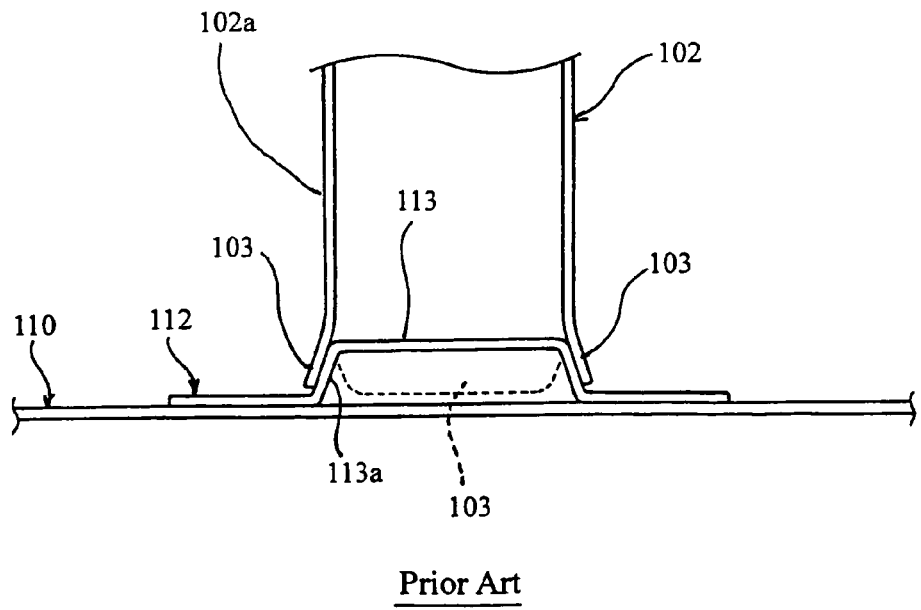
FIG. 16 is a cross-section of the rear structure obtained by cutting FIG. 15 along line XVI.

FIG. 14 is a side view of the rear part of a vehicle, corresponding to FIG. 2 used for the first embodiment.

The side plate member 61 includes a connection member 62, including front and rear connection parts 62A and 62B and an extension part 62C provided between the front and rear connection parts 62A and 62B, as an integral member. In other words, the extension part 62C extends from the rear end of the front connection part 62A by way of a front fold 62a, and the rear end of the extension part 62C extends to the front end of the rear connection part 62B by way of a rear fold 62b.

The front and rear connection parts 62A and 62B are respectively connected to the upper support portion 13D and the rear support portion 14D. Moreover, the extension part 62C of the connection member 62 is installed in the rear side member 13 so as to be downwardly inclined in a rearward direction of the vehicle. The side plate member 61 is provided in the rear side member 12 so that the flanges 62Ca are directed in a downward direction as shown in FIG. 14. By the provision of the flange, the rigidity of the extension part 62C is secured.

In the second embodiment, the second bend part 12C is positioned in the front support portion 13D of the rear side frame 12, especially in the region where the front connection part 62A of the connection member 62 is connected. The rigidity of the rear side member 12 has been designed to be changed at the second bend part 12C. Furthermore, the mounting part 37A of the lateral reinforcement plate 37 is superimposed on the upper surface of the rear connection part 62B of the connection member 62. The mounting part 37A is connected to the rear supporting part 14D together with the rear mount reinforcement member 45.

When a substance such as an automobile S collides with the hitch ball 32 of the trailer hitch 20 of the present invention, an impact load is applied to the hitch ball 32 by the rear-end collision. Then, the hitch ball 32 is pressed in a frontward direction, and hence the hitch ball support member 25, which suspended from the cross member, rotates in a forward direction. By the rotational movement of the hitch ball support member 25, a torsion or buckling deformation generates in the cross member 22.

Thus, the cross member 22 or the rear part 10 of the vehicle efficiently absorbs the impact load, and hence decreases the impact to be affected to the other part of the vehicle.

When the automobile S collides with the rear contact surface 37B of the trailer hitch 20 of the invention, the impact load applied to the rear contact surface 37B is transmitted to the rear support portion 14D of the lower rear side member 14 by way of the lateral reinforcement plate 37 and the lateral panel 36.

Owing to the configuration of the rear contact surface 37B, which is provided at a position lower than the rear support portion 14D, the impact load is received at a position which is offset from the axis of the rear side member 12. Namely, an offset load is applied to the rear support portion 14D of the rear side member 12. Accordingly, the rear side member 12 having a large rigidity change at the first bend part 12A is subjected to buckling deformation because of the bend part 12A. Thus, the impact load is absorbed by the rear side member 12.

When the rear support portion 14D is further pressed in a frontward direction simultaneously with the buckling deformation, the connection member 62 is bent at the first and the second folds 62a and 62b. Hence, the front support portion 13D of the upper rear side member 13 is lifted in accordance with the deformation of the extension part 62C. Consequently, the rear side frame 12 is subjected to a buckling deformation by the assistance of a second bend part 12C prepared in the rear side frame 12.

By the above discussed buckling deformation, the remaining impact load, which was not absorbed by the deformation of the first bend part 12A is efficiently absorbed by the rear side member 12. As a result, it is possible to eliminate or minimize the impact load applied to a person in the vehicle according to the present invention.

Similarly to the first embodiment, the impact load input to the hitch ball 32 is efficiently absorbed by the cross member 22 by the torsion or the buckling deformation thereof.

In addition to the above, the impact load applied to the rear contact surface 37B is also efficiently absorbed by the buckling deformation of the rear support member 12 by the assistance of the first and the second bend parts 12A and 12C. Namely, the trailer hitch 20, or the rear structure of the vehicle including the trailer hitch of the invention efficiently absorbs the impact load to minimize the distribution of the impact the other part of the vehicle.

The present invention being thus described, it will be clearly understood that the same may be varied in many ways. Such variations are not to be regarded as a departure from the spirit and scope of the present invention, and all such modification as would be easily understood to one skilled in the art are intended to be included within the scope of the appended claims.

What is claimed is:

1. A trailer hitch configured to be provided at a rear part of a vehicle, comprising:
   a pair of hitch side members, each of the hitch side members comprising:
      a lateral reinforcement plate extending in the lengthwise direction of the vehicle, the lateral reinforcement plate comprising a mounting part and a rear contact face, the mounting part being configured to be connected to a rear support portion of a rear side member of the vehicle and the rear contact face extending rearward from the mounting part and further extending downwardly; and
      a lateral panel extending in a lengthwise direction of the vehicle, the lateral panel provided with a cross member installation part at a rear end thereof;
   a cross member extending in a widthwise direction of the vehicle, and having ends connected to the cross member installation part; and
   a hitch ball support member having a hitch ball supported thereon, an upper end of the hitch ball support member being connected to the cross member at the center thereof with respect to the widthwise direction of the vehicle, and the hitch ball support member downwardly extending from the cross member.

2. A rear structure of a vehicle, comprising:
   a pair of rear side members, each of the rear side members having rear support portion and an upper plane and a lower plane extending in a lengthwise direction of the vehicle, the rear side members having a hollow rectangular cross section; and
   a trailer hitch comprising:
      a pair of hitch side members, each of the hitch side members comprising:
         a lateral reinforcement plate extending in a lengthwise direction of the vehicle, the lateral reinforcement late comprising a mounting part and a rear contact face, the mounting part positioned at a front end of a lateral reinforcement plate and being connected to a rear support portion of a rear side member, a rear contact face extending rearward from the mounting part and further extending downwardly; and
         a lateral panel extending in the lengthwise direction of the vehicle, the lateral panel including the cross member installation part at a rear end thereof;
      a cross member extending in a widthwise direction of the vehicle with ends thereof being connected to the cross member installation part; and
      a hitch ball support member which supports a hitch ball thereon, an upper end of the hitch ball support member being connected to the cross member at a center thereof with respect to a widthwise direction of the vehicle, and the hitch ball support member downwardly extending from the cross member.

3. A rear structure of a vehicle, comprising:
   a pair of rear side members, each one of the rear side members comprising a rear support portion and an upper plane and a lower plane extending in a lengthwise direction of the vehicle, wherein the lower plane of the rear side member has a rear support portion, and the upper plane of the rear side member comprising a front support portion provided in front of the rear support portion with respect to the lengthwise direction of the vehicle, the front support portion and the rear support portion being spaced apart from each other;
   a trailer hitch comprising:
      a pair of hitch side members, said each one of the hitch side members comprising:
         a lateral reinforcement plate extending in the lengthwise direction of the vehicle, the lateral reinforcement plate comprising a mounting part and a rear contact face, the mounting part positioned at a front end of the lateral reinforcement plate and being connected to a rear support portion of the rear side member, the rear contact face extending rearward from the mounting part and further extending downwardly; and
         a lateral panel extending in the lengthwise direction of the vehicle, the lateral panel including a cross installation part at a rear end thereof; and
      a connection member having a front connection part, a rear connection part, and an extension part provided between the front connection part and the rear connection part, so as to be integral with each other, the extension part extending from a rear end of the front connection part by way of a front fold, and a rear end of the extension part extending to the rear connection part by way of a rear fold;
      a cross member extending in a widthwise direction of the vehicle with ends thereof being connected to the cross member installation part; and
      a hitch ball support member which supports a hitch ball thereon, an upper end of the hitch ball support member being connected to the cross member at a center thereof with respect to a widthwise direction of the vehicle, the hitch ball support member downwardly extending from the cross member.

4. The rear structure of the vehicle as claimed in claim 3, wherein the extension part of the connection member comprises a front region and a rear region, the front region extending from the front connection part by way of the front fold, the rear connection part extending from the rear region by way of the rear fold, the front region and the rear region having a link part interposed therebetween, the link part comprising a rigidity that is less than a rigidity of the front region and the rear region.

5. A rear structure of a vehicle, comprising:
   a pair of rear side members, each of the rear side members comprising an upper plane and a lower plane extending in a lengthwise direction of the vehicle, wherein the lower plane of each of the rear side members comprises a rear support portion, and the upper plane of the rear side member comprises a front support portion provided in a front of the rear support portion with respect to the lengthwise direction of the vehicle, the front support portion and the rear support portion being spaced apart from each other;
   a trailer hitch comprising:
      a pair of hitch side members, each of the hitch side members comprising a mounting part, a cross member installation part, and a rear contact face, the mounting part being connected to the rear support portion, the mounting part being connected to the rear support portion of the rear side member so that the cross member installation portion protrudes from a rear end of the rear side member, and the rear contact face being provided at a height lower than a height of the mounting part; and
      a connection member comprising a front connection part, a rear connection part, and an extension part provided between the front connection part and the rear connection part so as to be integral with each other, the extension part extending from a rear end of the front connection part by way of a front fold, and a rear end of the extension part extending to the rear connection part by way of a rear fold;

a cross member extending in a widthwise direction of the vehicle, and having ends being connected to the cross member installation part; and a hitch ball supported by the cross member.

6. The rear structure of the vehicle as claimed in claim 5, wherein the extension part of the connection member comprises a front region and a rear region, the front region extending from the front connection part by way of the front fold, the rear connection part extending from the rear region by way of the rear fold, the front region and the rear region having a link part interposed therebetween, the link part having a rigidity lower than a rigidity of the front region and a rigidity of the rear region.

7. A trailer hitch configured to be provided at a rear part of a vehicle, said trailer hitch comprising:

a cross member extending in a widthwise direction of the vehicle;

a hitch ball support member having a hitch ball supported thereon, an upper end of the hitch ball support member being connected to the cross member at a center thereof with respect to the widthwise direction of the vehicle, and the hitch ball support member downwardly extending from the center of the cross member;

a pair of hitch side members, each of the hitch side members comprising a mounting part and a cross member installation part, each one of the pair of hitch side members being provided on opposing ends of the cross member and extending in a lengthwise direction of the vehicle;

a pair of connection members, each of the pair of connection members comprising a front region, a rear region, and a weak link part being provided between the rear region and the front region, the rear region being connected to a rear side member together with the mounting part of the hitch side member.

* * * * *